(12) United States Patent
Slayden et al.

(10) Patent No.: US 8,636,199 B1
(45) Date of Patent: Jan. 28, 2014

(54) SYSTEM AND METHOD FOR MATCHING A MEDIA MANIPULATION WITH A MEDIA MANIPULATION TEMPLATE

(75) Inventors: April M. Slayden, Redwood City, CA (US); Mathieu C. Hans, Mountain View, CA (US); Mark T. Smith, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1827 days.

(21) Appl. No.: 11/212,068

(22) Filed: Aug. 25, 2005

(51) Int. Cl.
*G06F 17/00* (2006.01)

(52) U.S. Cl.
USPC ............................................ 235/375; 700/94

(58) Field of Classification Search
USPC .................... 235/375, 472.01, 472.02; 700/94
See application file for complete search history.

(56) References Cited

U.S. PATENT DOCUMENTS

| | | | |
|---|---|---|---|
| 5,926,790 A * | 7/1999 | Wright | 704/275 |
| 6,629,077 B1 * | 9/2003 | Arling et al. | 704/275 |
| 2003/0063066 A1 * | 4/2003 | Thomas Brown | 345/156 |
| 2006/0227030 A1 * | 10/2006 | Clifford et al. | 341/176 |

* cited by examiner

*Primary Examiner* — Daniel Hess (57) ABSTRACT

Embodiments of the invention provide a system and method for matching a media manipulation with a media manipulation template. First, a media manipulation input is received. Next, the media manipulation input is compared with at least one stored media manipulation template. Then, the media manipulation input is modified to emulate at least one of the stored media manipulation templates when the media manipulation input is approximately equal to the at least one stored media manipulation template.

32 Claims, 7 Drawing Sheets

SYSTEM AND METHOD FOR MATCHING A MEDIA MANIPULATION WITH A MEDIA MANIPULATION TEMPLATE

TECHNICAL FIELD

The present invention generally relates to media manipulation. More specifically to a system and method for matching a media manipulation with a media manipulation template.

BACKGROUND

Media players, whether implemented in hardware or software, are widely available and popular for storing or playing audio or video (A/V) content (e.g., digital A/V streams, encoded sound/video recordings, etc.). Digital media may be digitized into different formats based on variables, such as bit rate, communication protocol(s), physical medium, compression algorithm, and other variables. Common digital media formats include, without limitation, MPEG (e.g., MP3, MPEG4 etc.), WAV, MIDI, DVD, and other formats known to those skilled in the art. Digital media in various digital formats can be transmitted, as a file or as a data stream, over wireless or wired communication networks via appropriate protocols (e.g., HyperText Transport Protocol (HTTP), Real-Time Streaming Protocol (RTSP), and other protocols).

Exemplary digital media players implemented in hardware include, without limitation, Apple iPod, SONICblue Rio, Casio's MP3 audio wristwatch, and other players known to those skilled in the art. Exemplary digital media players implemented in software include, without limitation, Music-Match's Jukebox, Realplayer, Microsoft Media Player, and other software players known to those skilled in the art.

Typically, a digital media player has functions that allow a user to enjoy digital media content in different ways. These functions may include playback, record, forward, reverse, skip, random play, repeat, and other functions. However, digital media players generally do not provide any content manipulation functions, such as DJ (disk jockey) or VJ (video jockey) functions (both DJ and VJ are referred to herein as DJ for purposes of brevity and clarity, however, it is appreciated that the term VJ is interchangeable with the term DJ throughout the text). Exemplary DJ functions include mixing, scratching, cueing, fading, reverse play, looping, and other functions. These functions are referred to as DJ functions because they are typically provided by specialized DJ digital turntables, whether implemented in hardware or software, to be used by professional DJs. However, it is appreciated that the same manipulation can be performed on video content in the same or similar manner. However, for purposes of brevity and clarity, the DJ function examples will be described in conjunction with audio manipulation.

For example, professional DJs using a specialized DJ digital turntable are able to perform DJ functions on digital audio content, for example, to create audio content for subsequent distribution via some type of media or for live events. Exemplary DJ digital turntables implemented in software include, without limitation, Acid Pro from Sonic Foundry and American Audio Pro Mix MP3 Player.

However, due to the training and precision required to perform a good audio and video media manipulation, when an amateur DJ performs, he/she may not hit the correct marks or perform with enough detail and expertise to provide a good mix. Instead, the lack of training or skill could result in a mix with obvious and or embarrassing errors. For example, a professional DJ is capable of stopping a song mid-phrase, performing a scratch, and releasing or resuming the song in the same location as it initially stopped. However, an amateur trying to perform the same mix may end up with the song resuming in a different location than where the song was initially stopped. In so doing, it would be apparent to listeners that the amateur DJ had made a scratching mistake. The same problem also exists with video scratches.

DISCLOSURE OF THE INVENTION

Embodiments of the invention provide a system and method for matching a media manipulation with a media manipulation template. First, a media manipulation input is received. Next, the media manipulation input is compared with at least one stored media manipulation template. Then, the media manipulation input is modified to emulate at least one of the stored media manipulation templates when the media manipulation input is approximately equal to the at least one stored media manipulation template.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to in this description should be understood as not being drawn to scale.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Nomenclature and Overview

The following are a listing of terms and devices of the art and their description. They are provided herein for purposes of brevity and clarity. In general, Pitch Control allows speeding up, or slowing down, of the audio stream at a constant rate, for example ±110% of the normal rate. Direction transposition is playing the audio stream in the opposite direction, similar to moving the record back and forth, changing the direction of the song. In one embodiment, the functionality is implemented using a high-quality sampling rate conversion library.

Scratching, sometimes referred to as Pitch Transposition, is also done using a sample rate conversion routine, except that the pitch varies at a much faster rate, similar to the rate defined by the DJ's hand spinning a record. The speed at which the pitch varies requires a more optimized sample rate conversion routine than for the Pitch Control in order to allow real-time processing. This is implemented using linear interpolation, which does not compromise the quality of the music.

Crossfading, e.g., switching between the two Virtual Turntables, is implemented linearly thereby allowing the user to control how much of the signal coming from one Virtual Turntable should be mixed with the other.

A Cue Switch allows one Virtual Turntable to be patched to the output channel for the head set while another Virtual turntable is patched to the main output such as to speakers, etc. thereby enabling the DJ to search for audio cues in a given channel before mixing. In another embodiment, more than two virtual turntables may be mixed together, and other types of processing may be introduced, such as Pitch Scaling (changing the pitch of a signal without changing its length), and Time Scaling (changing the length of a signal without changing its pitch).

Embodiments of the invention provide a system and method for matching a media manipulation with a media manipulation template. For example, scratching is accomplished by manipulating media (e.g., a turntable, virtual turntable, and the like) to produce direction changes and pitch effects as a function of the DJ's technique. Other manipulations can include looping, echo, filter, reverse play, and generating special sound effects. These techniques are learned, and like other forms of musical performance (or video presentation), they involve method and skill which improve with practice. However, by utilizing the templates described herein, and in one embodiment, in conjunction with the media manipulators 108*b* and 108*c*, professional DJ capabilities are available to a user regardless of the users skill and at a significantly reduced expense.

Implementation

Figure 1:
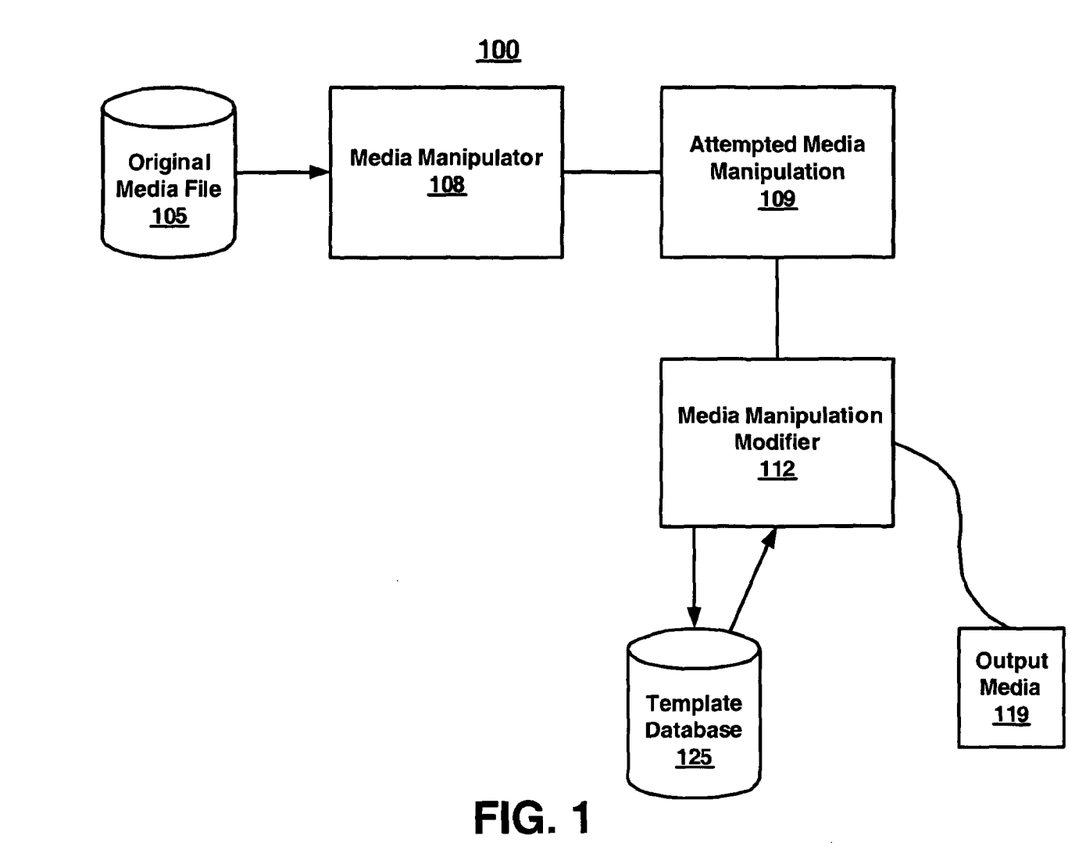
FIG. 1 is a diagram of an exemplary media manipulator and modifier system in accordance with one embodiment of the present invention.
Figure 3:
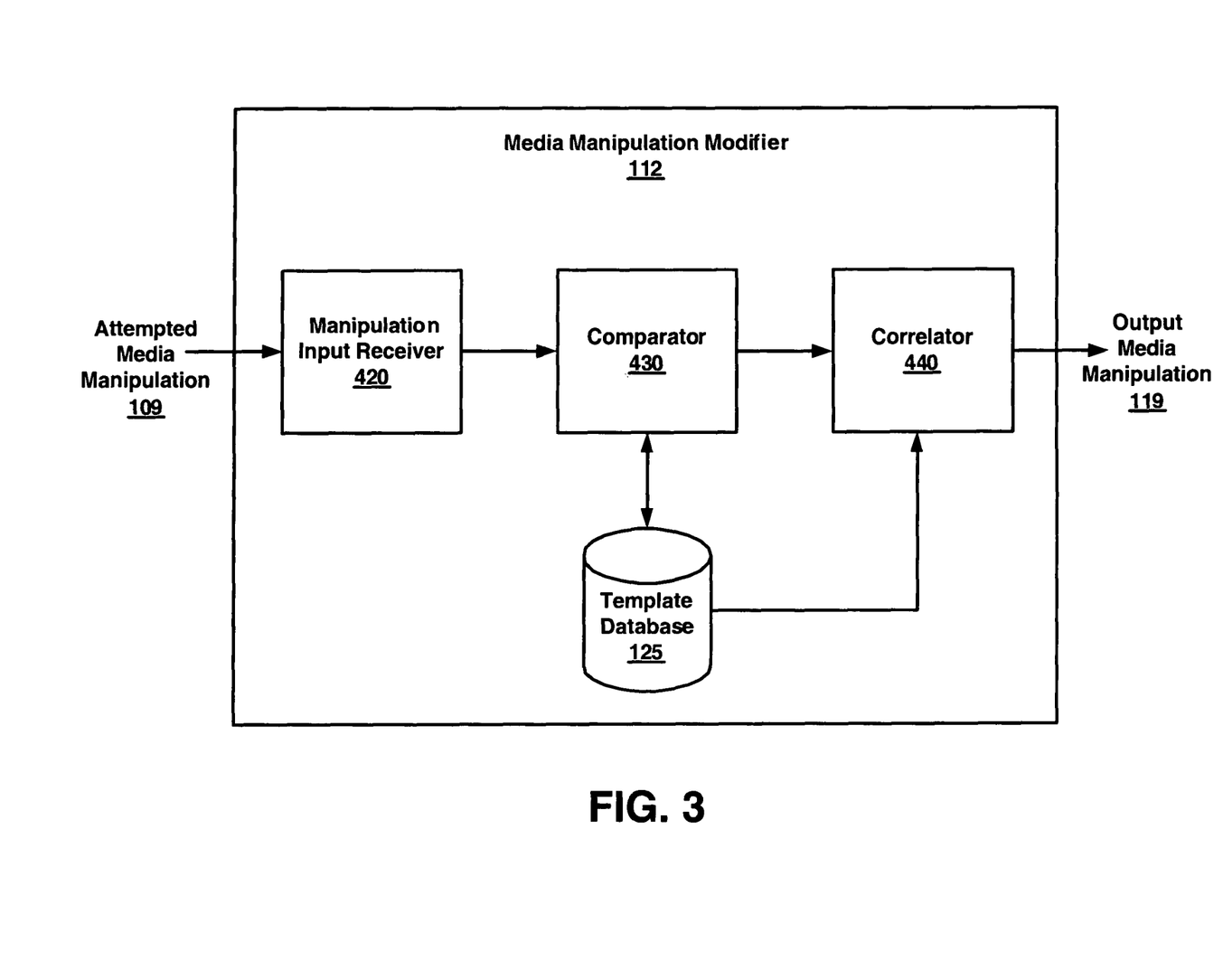
FIG. 3 is a block diagram of media manipulation modifier in accordance with one embodiment of the present invention.

With reference now to FIG. 1, a diagram 100 of an exemplary media manipulator and modifier system is shown in accordance with one embodiment of the present invention. Diagram 100 includes an original media file 105, a media manipulator 108, a media manipulation modifier 112, a template database 125 and an output 119. The template database 125 with at least one media manipulation template process therein may be standalone as shown in FIG. 1, or could reside on the media manipulation modifier 112 (as shown in FIG. 3). In one embodiment, the original media file 105 is a digital audio or video file. In another embodiment, the original media file 105 may include a plurality of digital audio or video files. In one embodiment, the media manipulator 108 is a standard digital media DJ turntable. In another embodiment, the media manipulator 108 is a handheld mixing device.

Figure 2A:
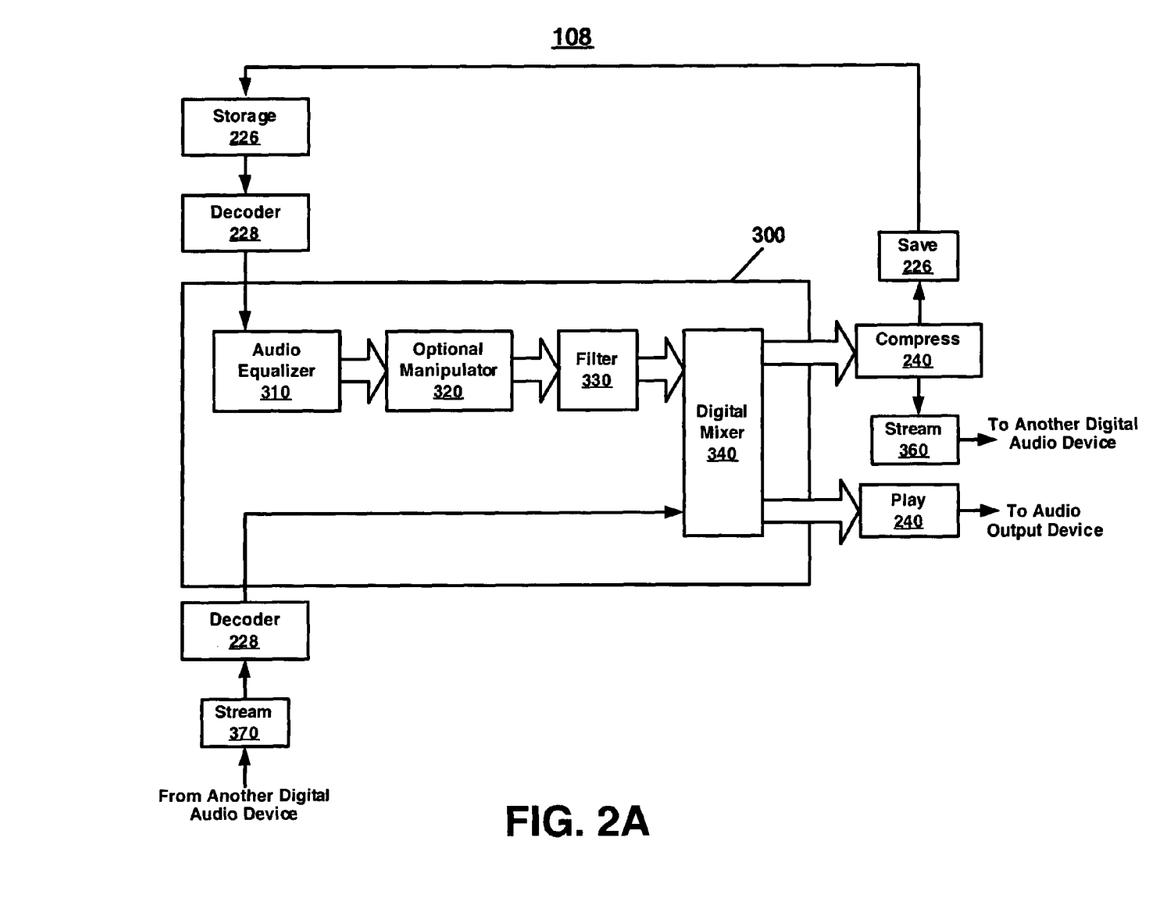
FIG. 2A illustrates a block diagram of an exemplary digital media integration/manipulation module in accordance with one embodiment of the present invention.
Figure 2B:
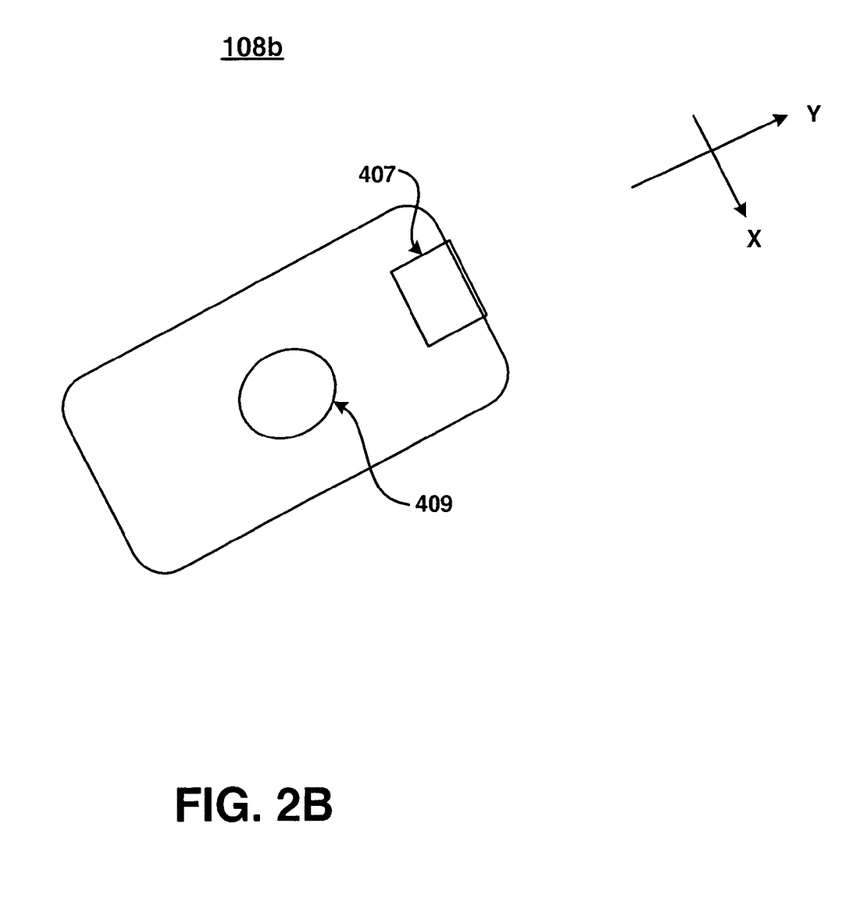
FIG. 2B is a diagram of an exemplary digital media integration/manipulation module optical sensor input device in accordance with one embodiment of the present invention.
Figure 2C:
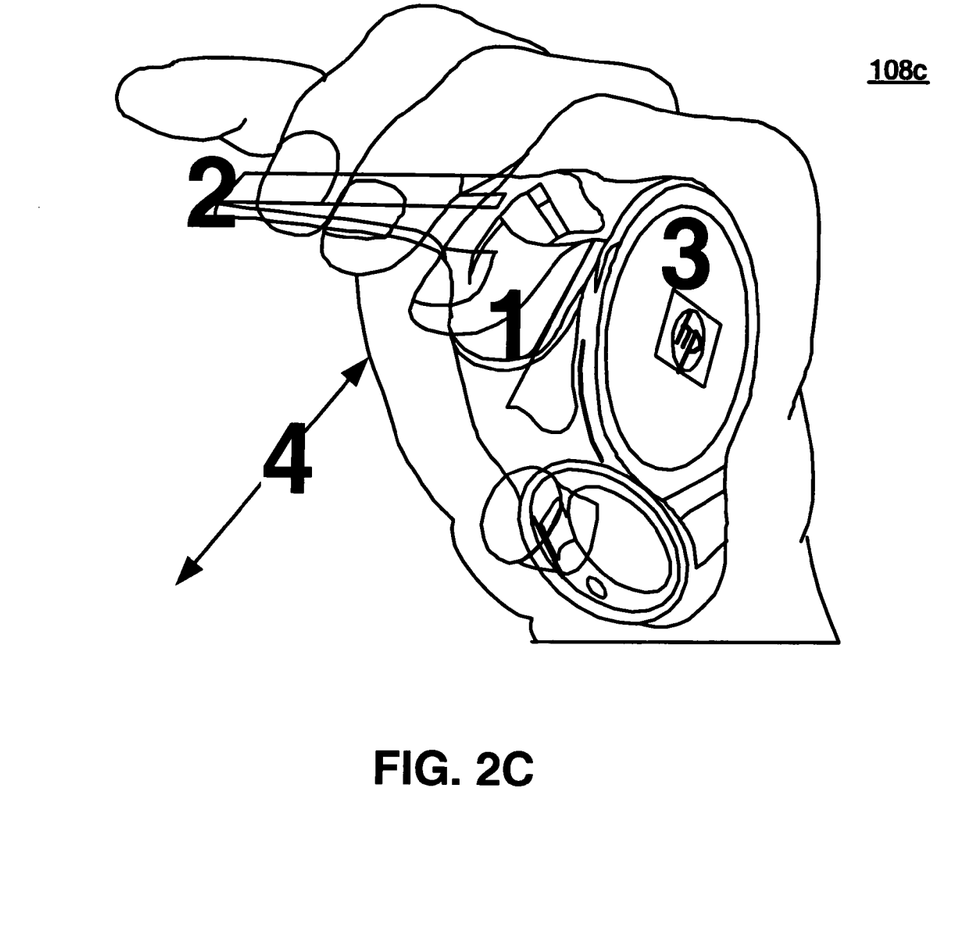
FIG. 2C is a diagram of an exemplary digital media integration/manipulation module motion sensor input device in accordance with one embodiment of the present invention.

With reference now to FIG. 2A, an exemplary digital audio/video (AV) integration/manipulation module is shown in accordance with one embodiment of the present invention. In one embodiment, the digital audio and video integration/manipulation module 108 includes an optional audio and video equalizer 310, an optional digital A/V manipulator 320, an optional filter 330, and a digital mixer 340.

The optional A/V equalizer 310 is a function used to correct or to add emphasis to specified frequency ranges. For example, in one embodiment, the A/V equalizer 310 is an electronic device. Techniques for implementing an equalizer are known in the art and need not be described in detail herein.

The optional digital A/V manipulator 320 may further manipulate equalized digital A/V content. For example, scratching may be performed on one or more digital A/V streams. Scratching refers to digitally changing pitch and direction by exploiting sample rate conversion properties and may be performed in response to inputs from a jog dial. For example, a user may use a jog dial to adjust the sample rate conversion, thereby effectively achieving the scratching sound effect. Other manipulating techniques (e.g., DJ functions) include, without limitation, looping, echo, filter, reverse play, and other techniques for achieving a particular sound effect. These manipulating techniques are known in the art, being commercially available in DJ digital turntables implemented in hardware and software, and need not be described in more detail herein.

The optional filter 330 performs any of a variety of known filtering functions on digital audio and video content. For example, the filter 330 might be used to attenuate a certain range of frequencies that is set by a cutoff frequency.

The optional modules described above are merely exemplary. Those skilled in the art will appreciate that still other implementations of these modules may be used. For example, the optional equalizer 310 and the optional digital audio and video manipulator 320 may be implemented as filters (e.g., similar to the optional filter 330).

The digital mixer 340 provides integration (e.g., mixing) of digital audio and video content. There are several types of mixing techniques, including, without limitation, beat mixing, key mixing, EQ mixing, fade mixing, FX mixing, remixing, and other mixing functions. Beat mixing, the most basic mixing technique, involves adjusting and synchronizing different beats in one or more digital audio and video streams such that the digital audio and video streams may be seamlessly played at the same time (e.g., when overlapping two songs, playing the end of a first song and the beginning of a second song at the same time and at the same speed or beats per minute (BPM)). The various types of mixing techniques are known in the art and need not be described in detail herein.

In an exemplary implementation, whether in hardware, software, or a combination thereof, the digital mixer 340 includes at least two channels and a crossfader. Typically, a channel controls digital audio and video content from a source. For example, each channel may have a volume slider (or a knob, etc.) which controls the output volume of digital audio and video content from a corresponding source. The crossfader allows a user to integrate output of multiple channels. For example, a crossfader may be implemented as a slider (or a knob, etc.) that provides control of incremental decreasing of the volume of digital audio and video content of a first source while proportionally increasing the volume of digital audio and video content of a second source. Digital mixers are commercially available (in hardware, software, or a combination thereof) and known in the art; thus, need not be described in more detail herein.

As shown in FIG. 2A, the digital mixer 340 may be configured to integrate (e.g., mix) a first digital audio and video stream obtained from an internal 226 or external storage (or perhaps even over a network) with one or more other digital audio and video stream(s) obtained from another device 370. In one implementation, the first digital audio and video stream (i.e., from storage or a network) is decoded by a decoder 228 then output to the audio and video equalizer 310.

A second digital audio and video stream may be obtained from a second digital audio and video device (not shown) that is operationally independent of the first digital audio and video device. In one implementation, the second digital audio and video device may stream the second digital audio and video stream to the first digital audio and video device in substantially real time via a wireless and wired communication network. In one instance, the second digital audio and video stream is decoded by a decoder 228 then output directly to the digital mixer 340 of the first digital audio and video device.

Alternatively, any or all of modules 310-340 could process encoded digital audio and video content (i.e., from storage 226 or another digital audio and video device 370) with a subsequent decoding performed after integration by the digital mixer 340.

In an exemplary embodiment, the integrated digital audio and video stream may be compressed, encoded, and played via the output interface 240. In one instance, the integrated digital audio and video stream is compressed and encoded then stored internally 226 or externally (or perhaps even over a network). In another instance, the integrated digital audio and video stream may be compressed and encoded and then streamed 360 in substantially real time to another device (e.g., the second digital audio and video device) via the wireless and wired communication network. In yet another instance, the integrated digital audio and video stream may be played via an output device, such as speakers. Of course, one or more of the above may be performed singly or in combination in accordance with a particular implementation. For example, the integrated digital audio and video stream may be compressed, stored, streamed, and played.

It is to be understood that one or more sub-modules of the digital audio and video integration/manipulation module 108 described above may be implemented (e.g., as programmed logic) in a single device or in multiple devices operating in a distributed computing environment. Further, one or more sub-modules described above of the digital audio and video integration/manipulation module 108 may be implemented as an add-on module. For example, an add-on module may comprise an interface for obtaining digital audio and video content (e.g., digital audio and video streams) from one or more digital audio and video devices and a mixer configured to (1) integrate digital audio and video content and (2) provide integrated digital audio and video content to one or more digital audio and video devices.

With reference now to FIG. 2B, a diagram of an exemplary digital media integration/manipulation module optical sensor input device 108b is shown in accordance with one embodiment of the present invention. In one embodiment, the media manipulator 108b is a handheld mixing device. Although the media manipulator 108b is described as a handheld mixing device herein, it is appreciated that the media manipulation input device 108b may be any of a plurality of devices such as joysticks, touch screens, digital turntables, motion sensors, light sensors, heat sensors, airflow sensors and the like which are capable of detecting many varying inputs in addition but not limited to motion and verbal cues. In additional embodiments, the sensor may be a video camera detecting a user's hand movement or a sensor measuring the amount of air a user is inhaling and exhaling.

In general, the a handheld mixing device 108b interface allows the digital DJ to control the media manipulation in a way such that technique and skill contribute to the final effect, similar to the turntable platter. In one embodiment, e.g., device 108b, a 2D optical sensor 409 is used to provide the media manipulation. In one embodiment, the 2D optical sensor 409 will utilize the location pointing device commonly found in optical computer mice, and is based on an autocorrelation method. In general, the device 108b uses a 2D active pixel array to capture an image of a surface having a statistically random surface texture. The fibers making up a sheet of paper are a good example of such surface texture. As the imaging device moves, frames are captured and auto correlated at a high rate from one frame to the next in order to derive a 2D motion vector. Similar to a turntable, the optical sensor 409 has no motion or travel range limits. Therefore, the user (e.g., DJ) can move it over large surfaces, as well as over clothing or other objects.

In another embodiment, the optical media manipulator 108b may include a button or buttons 407 to add an extra control(s) in the form of mode or "shift" key(s) that can be used for special effects. In one embodiment, using the fingers as the imaged surface provides good performance, both because of a fine level of control due to finger dexterity, and because skin has substantial surface texture. However, in one embodiment, since most optical devices have a fixed focus mechanically set by the housing, fingers pressed against the opening of the imaging device will tend to extrude skin through the opening, thus defocusing the skin surface to the point where it cannot be imaged properly.

In one embodiment, by covering the opening, e.g., placing a thin piece of glass, such as a microscope slide cover slip or similar component over the opening, even a standard optical mouse can be used as to register finger motion. In another embodiment, the optical device will be used on clothing, paper, a desk, or other surface such that no modification to the optical device is necessary. In other words, whatever surface is used, the optical sensor 409 is capable of detecting touch, relative position, motion, and acceleration. These events are mapped to pitch changing parameters in the scratching algorithms.

Table 1 shows an exemplary embodiment of the mapping of the accelerometer and optical sensor events to scratching parameters in device 108b having three fields of motion. However, in another embodiment, the table would be changed based on the actual number of accelerometer inputs contained by the device 108b. In one embodiment, motion in the optical sensor's X direction causes scratching events to occur, with the pitch left at a point determined by the final relative X axis position when motion stops. Pressing a button on the optical sensor case 108b, for example a mouse button, causes the pitch to be set to zero or a user defined value. The accelerometer events cause the pitch to be set downwards proportional to the X-axis acceleration. This supports a "grab and shake" or striking motion usage.

Therefore, without any further events, the pitch monotonically returns to normal pitch at a rate set by a configuration parameter. This rate could be set by a currently unused sensor axis, such as the optical Y-axis. Many of the currently unused sensor output combinations and buttons could be mapped to reflect the user's preferences, such as volume and balance controls, scrolling though music selections, or special sound effects. In another embodiment, the media manipulator 108b uses the plurality of sensor combinations to produce a greatly enhanced range of scratching, composing and synthesized effects.

TABLE 1

| Optical X Axis | Set pitch offset |
|---|---|
| Optical Y Axis | Scratch based on motion |
| Accelerometer X | Scratch based on |
| Mouse Button Press | Set pitch to 0 or preset |

Referring now to FIG. 2C, a diagram of an exemplary digital media integration/manipulation module motion sensor input device is shown in accordance with one embodiment of the present invention. Although a model of an optical sensor and motion sensor are described herein, it is appreciated that embodiments of the present invention are well suited for utilization in conjunction with a plurality of input devices such as heat sensors, light sensors, bio sensors and the like. In general, an accelerometer is a device for measuring acceleration forces in a large number of potential applications, for example in the hard disk market to detect motion and shock. In one embodiment, it is a single axis accelerometer (e.g., registering linear input). In another embodiment, it is a double axis accelerometer (registering planer input). In yet another embodiment, it is a triple axis accelerometer (providing three dimensional motion sensitivity).

Regardless of the configuration, in one embodiment each axis has a lower frequency limit below 1 Hz and a typical sensitivity of about 1.8 mV/g making it useful for detecting human motion. It is ideal for the motion sensing media manipulator 108c in that it can be used to allow scratching based on moving as well as dancing with, shaking, or striking the media manipulator 108c much as a musician might use percussion instruments. Acceleration in X, Y, and Z can produce events that are mapped to pitch changing parameters in the scratching algorithms. Composite motion such as circular acceleration can also be detected. The accelerometer is built into the media manipulator 108c unit and is used by moving the entire device. This opens up many creative opportunities, for example exploiting mobility and wearability, by strapping the media manipulator 108c onto one's ankle, or using it while riding in a vehicle.

In general, the media manipulator 108c is designed to be customizable according to different usage scenarios. That is, each button (e.g., buttons 1-3) can be mapped to the several different music manipulation features based on a plurality of reasons including those techniques most commonly used by DJs, or personal taste. For example, the map-able features include muting the current media (e.g., song, video, or the like), pausing the current media, jumping to a predefined breakpoint in the current media, or toggling the scratch feature. Muting the current media is synonymous with having a sharp-slope on the crossfader, which is commonly preferred by DJs when they are scratching. It allows the DJ to hear the current song through headphones but not have the output playing through the speakers until it is "unmuted". Pausing the current song is synonymous with the DJ placing and holding a hand on the vinyl which stops the song from playing. Jumping to a predefined breakpoint at the beginning of the current song is similar to a DJ using a marked record and moving the needle to begin playing a certain sample. Toggling the scratch feature is similar to the DJ touching the record.

Similarly, when the scratch feature is enabled, signals from the accelerometer are mapped to various pitch values which will change the speed and direction of the current playing song. For example, if the DJ quickly moves the hand holding the media manipulator 108c away from his/her body very quickly, the music file will play faster than the normal speed in the forward direction. If the DJ slowly pulls the media manipulator 108c towards his/her body, the music will play slower than the normal speed but backwards. If the scratch feature is not enabled, the values returned by the accelerometer will be ignored thereby allowing the DJ to move freely without affecting the music.

Mapping the complex controls of a traditional DJ station onto one hand deserved a great deal of care and remains re-configurable for user preference. FIG. 2C is merely one embodiment depicting a possible mapping scenario for the buttons and the accelerometer:

The index-finger button (2) was mapped to Scratch-Enable
The long right arm button (1) was mapped to Mute
The round side button (3) was mapped to Breakpoint
The accelerometer values (4) were mapped to pitch speed and direction The following is one exemplary embodiment of the algorithm utilized in the mapping of the media manipulation devices 108b and 108c. In general, by using the turntable terminology, the pitch is defined as the ratio of the rotation speed of a turntable platter and the record normal rotation speed. For example, a 33⅓ revolutions per minute (RPM) record has a normal speed of 33⅓ RPM, and a pitch of +200% suggests that the rotation of the platter is twice faster than normal speed, while a pitch of (minus) −100% refers to reverse playing the record at normal speed.

For the media manipulator 108b, media manipulator 108c and the like, pitch control is used to control the audio stream's tempo, slowing down or speeding up the play out of the stream. The DJ uses this control to alter the speed of the music when beat matching, for example 105% to increase the tempo by 5%. Scratching is also done by modifying the pitch but at a much faster rate, similar to the rate defined by the DJ's hand spinning a record. The difference between Pitch Control and Scratching is mostly the rate at which the rate is modified as well as the duration for which the pitch is modified. For example, pitch control usually lasts much longer than scratching, such as for the entire length of the song.

For example, in one embodiment the media manipulator 108b and 108c implementation of the Pitch Control and Scratching is summarized with the following pseudo code:

```
forever( ){
    read_ui( );
    sensor_control( );
    audio_engine( );
}
```

Where the three routines are defined as follows:
read_ui( ) reads the user interface, e.g. start or stop playing, change MP3 track, toggle sensors on/off, etc.

sensor_control( ) reads the optical, accelerometer, and other sensor device driver outputs and maps them to pitch values.

audio_engine( ) decodes the audio stream, pitch transposes the stream, and sends it to the audio mixer.

The following are three exemplary steps defining how the accelerometer sensor relates to the control of the digital turntables. As stated herein, these steps are modifiable based on a plurality of data points including user preference and the number of available accelerometers.

1. read×acceleration value from device driver /dev/badge4/acc_x,
2. map×acceleration value to pitch value,
3. run the audio engine with the calculated pitch.

The first two steps are part of the sensor_control( ) routine. In the first step, the character device driver /dev/badge4/acc_x returns the analog-to-digital converted raw sensor data of the on-board three (or two or one) axis accelerometer as an 8-bit unsigned value. This value is then mapped in the second step to a pitch value using a lookup table. As stated herein, many mappings are possible.

In one embodiment, to implement the Pitch Control functionality, the media manipulator renders the audio and video at the pitch value mapped in the sensor_control( ) routine, for example half the normal speed in case the pitch is set to +50%. To implement Scratching, the media manipulator simulates the turntable motor counter-reaction, which forces the record to return to normal rotation speed (+100%) once the DJ removes her hand from the platter. So when the pitch sensor-mapped value is 0%, the music briefly stops and slowly speeds up to return to normal speed. On the other hand, when the pitch value is mapped to +200%, the music briefly plays at twice the normal speed and then slows down to normal speed.

The implementation of this return function is done in the sensor_control( ) routine. Various functions may be defined to allow the music to return to normal speed. One implementation uses a simple linear function, modifying the pitch by a constant delta value at constant time intervals. Another implementation uses an exponential-based function to better simulate the mechanical characteristics of the turntable. Control of the digital turntable with the optical sensor follows the same three step logic, but the first step is replaced with read y direction from device driver /dev/input/mice.

The second step defines a different mapping between the y direction and the pitch value, with the optical mouse buttons offering additional control. For example, the push of the left button may be mapped to instantly set the pitch to 0%. Many of the currently unused sensor output combinations and buttons could be mapped to reflect the user's preferences, such as volume and balance controls, scrolling though music selections, or special sound effects.

With reference now to FIG. 3, a block diagram of a media manipulation modifier 112 is shown in accordance with one embodiment of the present invention. In general, media manipulation modifier 112 includes a manipulation input receiver 420, a comparator 430, a media manipulation template database 125 and a correlator 440. As stated herein, the media manipulation modifier 112 is used to correlate an attempt at a media manipulation with a stored media manipulation. For example, when an attempted media manipulation 109 is received at the manipulation input receiver 420 it is passed to a comparator 430 which compares the attempted media manipulation 109 with a database of media manipulation templates 125. If a comparable media manipulation template 125 is found, the correlator 440 then matches the attempted media manipulation 109 with the media manipulation template 125 resulting in an output media manipulation 119.

Figure 4:
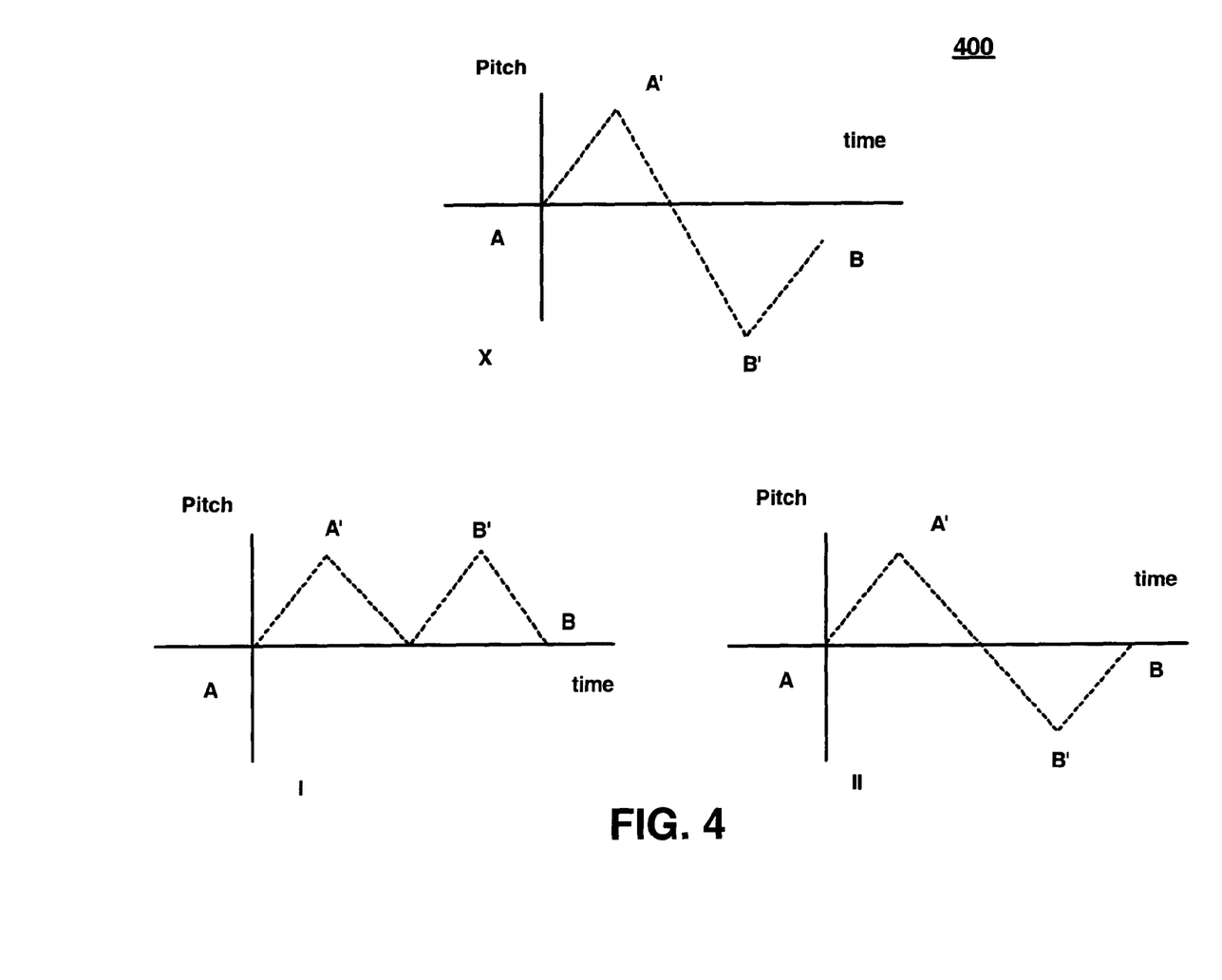
FIG. 4 is a plurality of graphs of a media manipulation comparison performed by the media manipulation modifier in accordance with one embodiment of the present invention.

For example, as shown in FIG. 4 and with reference still to FIG. 3, a plurality of graphs 400 (e.g., X, I and II) of a media manipulation comparison performed by the media manipulation modifier is shown in accordance with one embodiment of the present invention. In the attempted media manipulation 109 the DJ stopped the media at a certain point A, performed a media manipulation (e.g., A-A'-B'-B), and then tried to resume playing of the media at the same reference point as A, but instead released at point B which would cause the media to resume at a disjointed location. The comparator 430 would compare the attempted media manipulation 109 with any media manipulation templates 125 (e.g., I, II) in the database. If a media manipulation template 125 (e.g., template II) is found that stopped the media at a certain point A, performed (or closely performed) the media manipulation (e.g., A-A'-B'-B), and then resumed playing of the media at the correct reference point of the song e.g., B, the correlator 440 would apply the template II to the attempted media manipulation 109 thereby resulting in a modified (e.g., corrected) media manipulation 119 being output.

Therefore, the output media manipulation 119 would be a manipulation that stopped the media at a certain point A, performed a media manipulation (e.g., A-A'-B'-B) as attempted by the initial manipulation 109, and then resumed playing at the correct point B as shown in template II. In so doing, the attempted media manipulation 109, although initially flawed, would result in a media manipulation 119 which is seamlessly and flawlessly received by the viewer and listener. In one embodiment, the manipulation input receiver 420, comparator 430, media manipulation templates database 125 and correlator 440 are distinct components. In another embodiment, the manipulation input receiver 420, comparator 430, media manipulation template database 125 and correlator 440 are a single component. They are shown as distinct components herein merely for purposes of brevity and clarity.

Figure 5:
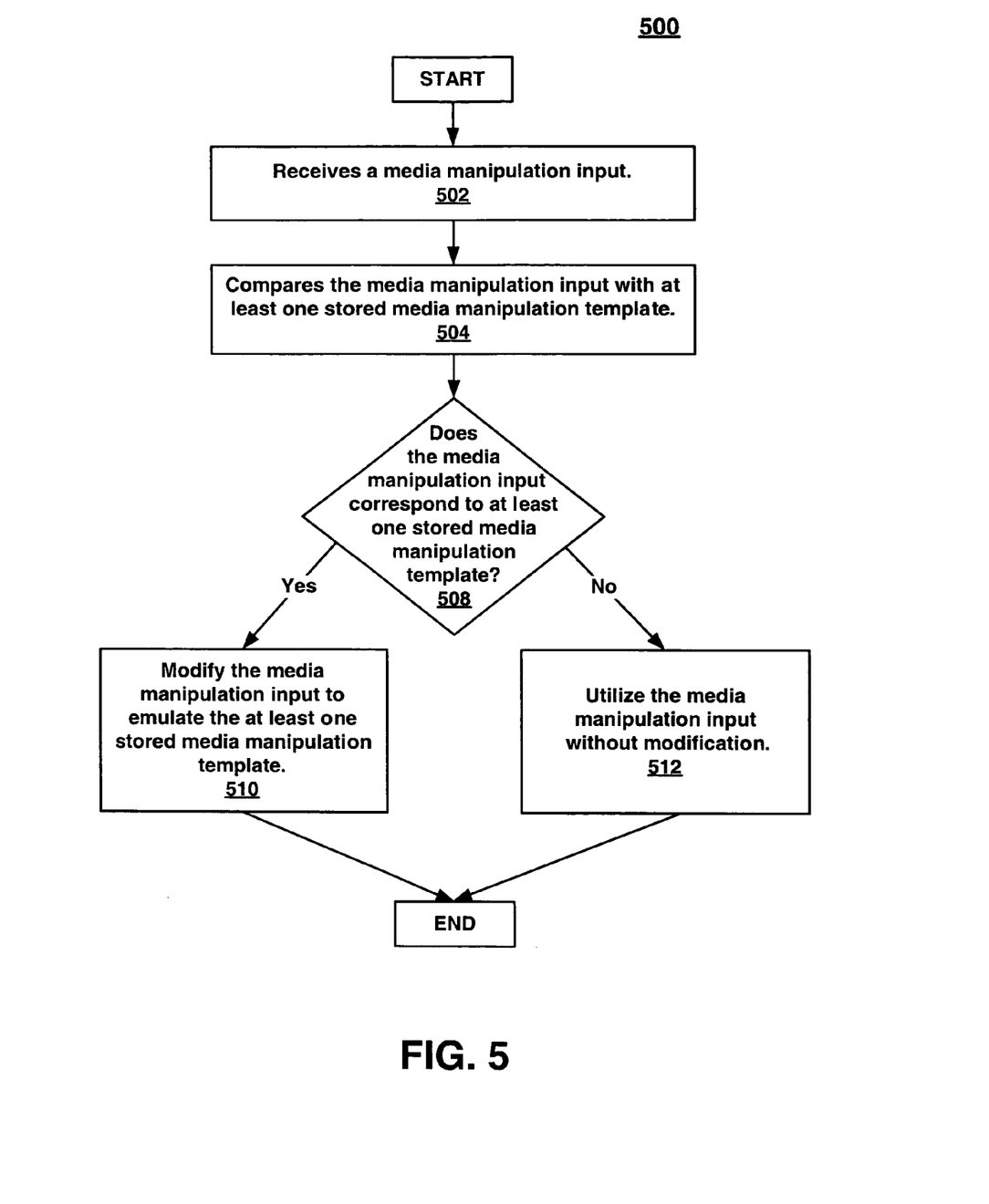
FIG. 5 is a flow chart of the steps for matching a media manipulation with a media manipulation template in accordance with one embodiment of the present invention.

Referring now to FIG. 5, a flow diagram 500 of one exemplary embodiment for matching a media manipulation with a media manipulation template is shown in accordance with an embodiment of the present invention. Utilizing embodiments of the invention, a novice user (or even a practiced user that makes a mistake) would have the ability to manipulate digital media (e.g., music, video, and the like) in a variety of ways. In addition, the media manipulations (e.g., scratch templates and the like) are downloadable, updateable, editable, and creatable to allow a user to perform an endless variety of media manipulations wherein the manipulations that correspond to or are statistically (or almost) similar but are slightly different will be adjusted to match the stored template. In so doing, the learning curve required to manipulate media is reduced, the output of accidental errors is reduced, while the overall output quality and the different methods for a user to interact with their music are increased, e.g., through motion, sound, force, and the like.

With reference now to step 502 of FIG. 5 and to FIG. 3, one embodiment receives a media manipulation input. In general, the media manipulation 109 may be video, audio and a combination of video and audio. As described herein, the media manipulation 109 may be provided from a plurality of resources such as, a media manipulator, a digital turntable, and the like.

Referring now to step 504 of FIG. 5 and to FIG. 3, one embodiment compares the media manipulation input with at least one stored media manipulation template. As described herein, the comparator 430 is utilized to compare the attempted media manipulation 109 with any templates stored in the media manipulation template database 125.

Referring now to step 508 of FIG. 5 and to FIG. 3, one embodiment then decides whether the media manipulation input 109 corresponds (e.g., is similar) to at least one stored media manipulation process (e.g., a template such as a scratch template). For example, the correlation may be a statistical comparison. That is, the attempted media manipulation 109 is statistically compared to the templates within the media manipulation template database 125. In other words, if the attempted media manipulation 109 is within a percentage (e.g., a 75 percent match, a 90 percent match, a 40 percent match, or the like) of the template in the database 125, then a match is registered.

In one embodiment, the percentage is adjustable. For example, when a novice user initially begins to manipulate media, the user may set the percentage to a low percentage match such as 40 percent. That way, it is assured that the media manipulator modifier 112 will catch many mistakes and apply a lot of help in making the user's manipulation look good or sound good or look good and sound good. However, as the user progresses in skill, manipulation understanding, and the like, increase (or if the manipulating device is passed between users) the percentage may be increased (e.g., a 90 percent match, or other) to provide less interaction with the user's attempted media manipulations 109. In another embodiment, the percentage will automatically increase as a user gains time on the manipulation device. In so doing, the media manipulation modifier 112 is a useful tool for the novice user, the expert, and any user in between.

With reference now to step 510 of FIG. 5 and to FIG. 3, if the media manipulation input 109 does correlate to a template and is a statistical comparison percentage match, then the correlator 440 will modify the media manipulation input 109 to emulate at least one of the stored media manipulation templates 125 and output the modified media manipulation as output media manipulation 119. In another embodiment, the correlator 440 will modify the media manipulation input 109 to emulate a plurality of the stored media manipulation templates 125. For example, the attempted media manipulation 109 may be a combination of templates and or manipulations. In that case, the comparator 430 would compare sequences of the media manipulation to a plurality of templates and provide resulting statistically matching templates to the correlator 440 for correlation.

However, with reference now to step 512 of FIG. 5 and to FIG. 3, if the media manipulation input 109 does not correlate to a template or is not a statistical comparison percentage match, then the correlator 440 will not modify the media manipulation input 109 and the output from the media manipulation modifier 112 will be the same as the input of the attempted media manipulation 109.

Thus, embodiments of the present invention provide methods and systems for matching a media manipulation with a media manipulation template. Moreover, embodiments of the present invention provide an adjustable matching criterion for differing skill levels. Additionally, the method and system for matching a media manipulation with a media manipulation template is utilized in audio formatted media, video formatted media, and a collaboration of audio and video formatted media.

Embodiments of the present invention are thus described. While the present invention has been described in particular embodiments, it should be appreciated that the present invention should not be construed as limited by such embodiments, but rather construed according to the following claims.

We claim:

1. A method for matching a media manipulation with a media manipulation template, comprising:
   receiving a media the at a device;
   receiving a media manipulation input for manipulating said media file to emulate media manipulation functions provided by a DJ turntable, at said device, wherein said media manipulation input is generated by wholly moving said device;
   comparing said media manipulation input with at least one stored media manipulation template; and
   modifying the media manipulation input to emulate at least one said stored media manipulation template when said media manipulation input corresponds to said at least one stored media manipulation template.

2. The method of claim 1 further comprising:
   maintaining the media manipulation input format when said media manipulation input does not correspond to said at least one stored media manipulation template.

3. The method of claim 1 wherein prior to receiving said media manipulation input, said method comprises:
   utilizing a handheld device to generate said media manipulation.

4. The method of claim 3 wherein said handheld device comprises:
   providing a single accelerometer to provide feedback to manipulate said media based on a motion of said handheld device.

5. The method of claim 3 wherein said handheld device comprises:
   providing a plurality of accelerometers to provide feedback to manipulate said media file based on a plurality of motions of said handheld device.

6. The method of claim 3 wherein said handheld device utilizes at least one sensor selected from the group of sensors including: motion sensor, light sensor, heat sensor and bio sensor.

7. The method of claim 3 further comprising:
   utilizing a wireless format for said handheld device.

8. The method of claim 1 wherein said media file is selected from a group of media formats including: audio formatted media, video formatted media, and a collaboration of audio and video formatted media.

9. A media manipulation modifier for correlating a media manipulation with a media manipulation template, comprising:
   a manipulation input receiver for receiving a media manipulation input, at a handheld device, wherein said media manipulation input is for manipulating a media file to emulate media manipulation functions provided by a DJ turntable, wherein said media manipulation input is generated by wholly moving said handheld device, wherein said media file is received at said handheld device;
   a comparator for comparing said media manipulation input with at least one stored media manipulation process; and
   a correlator for modifying the media manipulation input to emulate at least one said stored media manipulation process when said media manipulation input corresponds to said at least one stored media manipulation process.

10. The media manipulation modifier of claim 9 wherein the original media manipulation input format is retained when said media manipulation input does not correspond to said at least one stored media manipulation process.

11. The media manipulation modifier of claim 9 wherein the handheld device is utilized to generate said media manipulation received to said media manipulation input.

12. The media manipulation modifier of claim 11 wherein said handheld device utilizes a single accelerometer to provide feedback to manipulate said media file based on the motion of said handheld device.

13. The media manipulation modifier of claim 11 wherein said handheld device utilizes a plurality of accelerometers to provide feedback to manipulate said media file based on a plurality of motions of said handheld device.

14. The media manipulation modifier of claim 11 wherein said handheld device utilizes at least one sensor selected from the group of sensors including; motion sensor, light sensor, heat sensor and bio sensor.

15. The media manipulation modifier of claim 11 wherein said handheld device is wireless.

16. The media manipulation modifier of claim 9 wherein said media file is selected from a group of media formats including: audio formatted media, video formatted media, and a collaboration of audio and video formatted media.

17. A computer-usable medium having computer-readable program code embodied therein for causing a computer system to perform a method for matching a media manipulation with a media manipulation template, comprising:
 receiving a media file at a device;
 receiving a media manipulation input for manipulating said media file to emulate media manipulation functions provided by a DJ turntable, at said device, wherein said media manipulation input is generated by wholly moving said device;
 comparing said media manipulation input with at least one stored media manipulation process; and
 modifying the media manipulation input to emulate at least one said stored media manipulation process when said media manipulation input corresponds to said at least one stored media manipulation process.

18. The computer-usable medium of claim 17 further comprising:
 maintaining the media manipulation input format when said media manipulation input does not correspond to said at least one stored media manipulation process.

19. The computer-usable medium of claim 17 wherein prior to receiving said media manipulation input, said method comprises:
 utilizing a handheld device to generate said media manipulation.

20. The computer-usable medium of claim 19 wherein said handheld device comprises:
 providing a single accelerometer to provide feedback to manipulate said media file based on a motion of said handheld device.

21. The computer-usable medium of claim 19 wherein said handheld device comprises:
 providing a plurality of accelerometers to provide feedback to manipulate said media file based on a plurality of motions of said handheld device.

22. The computer-usable medium of claim 19 wherein said handheld device utilizes at least one sensor selected from the group of sensors including: motion sensor, light sensor, heat sensor and bio sensor.

23. The computer-usable medium of claim 19 further comprising:
 utilizing a wireless format for said handheld device.

24. The computer-usable medium of claim 17 wherein said media file is selected from a group of media formats including: audio formatted media, video formatted media, and a collaboration of audio and video formatted media.

25. A method for using a handheld media manipulator to manipulate a media file comprising:
 receiving a media file at a handheld device;
 utilizing at least one sensor on the handheld device to generate a manipulation pattern for the media file, wherein said manipulation pattern is generated wholly moving said handheld device;
 outputting a media manipulation of the media file based on the manipulation pattern generated by said handheld device;
 receiving the media manipulation input at a media manipulation modifier, wherein said media manipulation input is for manipulating the media file to emulate media manipulation functions provided by a DJ turntable;
 comparing said media manipulation with at least one stored media manipulation template; and
 modifying the media manipulation to emulate at least one said stored media manipulation template when said media manipulation corresponds to said at least one stored media manipulation template.

26. The method of claim 25 further comprising:
 maintaining the media manipulation format when said media manipulation does not correspond to said at least one stored media manipulation template.

27. The method of claim 25 further comprising:
 comparing said media manipulation with a plurality of stored media manipulation templates; and
 modifying the media manipulation to emulate a plurality of said stored media manipulation templates when said media manipulation is approximately equal to a plurality of stored media manipulation templates.

28. The method of claim 25 wherein said handheld media manipulator comprises:
 providing a single accelerometer to provide feedback to manipulate said media the based on a linear motion of said handheld device.

29. The method of claim 25 wherein said handheld media manipulator comprises:
 providing a plurality of accelerometers to provide feedback to manipulate said media file based on a plurality of motions of said handheld device.

30. The method of claim 25 further comprising:
 utilizing a wireless format for said handheld media manipulator.

31. The method of claim 25 wherein said media the is selected from a group of media formats including: audio formatted media, video formatted media, and a collaboration of audio and video formatted media.

32. The method of claim 25 wherein said at least one sensor is selected from the group of sensors including: motion sensor, light sensor, heat sensor and bio sensor.

* * * * *

UNITED STATES PATENT AND TRADEMARK OFFICE
CERTIFICATE OF CORRECTION

PATENT NO.        : 8,636,199 B1                                    Page 1 of 1
APPLICATION NO.   : 11/212068
DATED             : January 28, 2014
INVENTOR(S)       : April M. Slayden et al.

It is certified that error appears in the above-identified patent and that said Letters Patent is hereby corrected as shown below:

In the Claims:

In column 12, line 4, in Claim 1, delete "the" and insert -- file --, therefor.

In column 13, line 13, in Claim 14, delete "including;" and insert -- including: --, therefor.

In column 14, line 43, in Claim 28, delete "the" and insert -- file --, therefor.

In column 14, line 53, in Claim 31, delete "the" and insert -- file --, therefor.

Signed and Sealed this
Third Day of June, 2014

Michelle K. Lee
*Deputy Director of the United States Patent and Trademark Office*